Sept. 27, 1932.   G. H. GIBSON   1,879,930
WATER DEAERATION
Original Filed Sept. 26, 1924
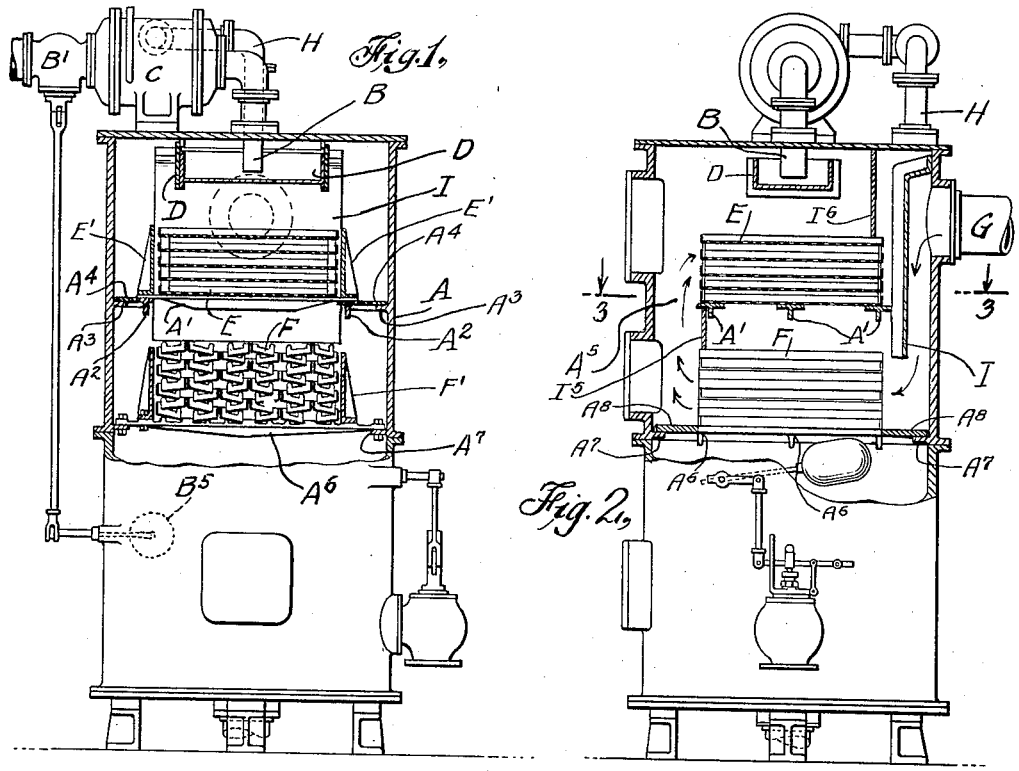
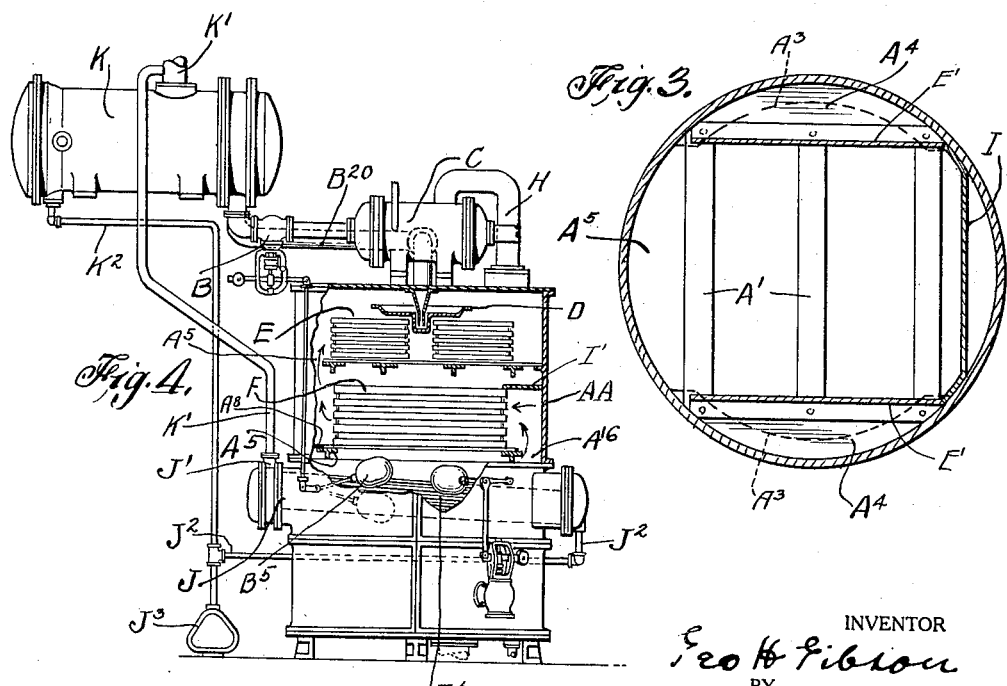
INVENTOR
Geo. H. Gibson
BY
John E. Hubbell
ATTORNEY Patented Sept. 27, 1932

1,879,930

UNITED STATES PATENT OFFICE

GEORGE H. GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA

WATER DEAERATION

Application filed September 26, 1924, Serial No. 740,049. Renewed October 7, 1926.

My present invention consists in improvements in method of and apparatus for heating and deaerating water especially devised and adapted for heating boiler feed water to a moderate temperature, which may be 212° or above or below 212° F., and at the same time eliminating all air therefrom.

The invention is characterized by the provisions made for scrubbing the water with steam to eliminate the final residue of air therefrom after the water has first been subjected to a preliminary heating operation by contact with steam previously used in the final scrubbing operation. The preliminary water heating operation may well be carried out by heating trays such as are used in an ordinary open feed water heater over which the water passes in finely divided broken streams through an atmosphere of steam admixed with the air liberated from the water. In this preliminary heating stage the water is heated nearly to the temperature of saturated steam at the pressure of the atmosphere in which the water is heated. The water is not heated quite to such temperature, however, because the atmosphere itself, owing to its air content, will not be as hot as pure steam at the same total pressure. Regardless of how high the original air content in the water may have been, after this preliminary treatment the water will contain but a relatively small amount of air in solution, and with a suitable and practical arrangement of the trays or other provisions for causing the water to flow in broken and divided streams through the heating space, most of the air driven out of solution as the water is heated up will have actually separated from the water. The quantity of air remaining in solution in the water and in entrainment therein after the preliminary heating while relatively minute, is nevertheless seriously objectionable where air free water is required as in the case of boiler feed water which is to be further heated in an economizer; and the gist of the present invention consists in the combination with the preliminary water heating means, of means for subjecting the water to a further heating and deaerating effect to thereby provide simple, compact and relatively inexpensive apparatus well adapted for practical commercial use in preheating and completely deaerating boiler feed water.

A characteristic feature of the final heating and deaerating portion of the apparatus consists in the provisions made for continuously subjecting the water, after the latter has received its preliminary heating and deaerating treatment, to contact with steam brought into contact with the water in such manner that while in the initial stages of the final treatment, the steam may be slightly contaminated by the admixture therewith of air liberated from the water, in the final stage or stages of the final treatment, the steam contacting with the water will be air free or practically so.

Apparatus operating in accordance with the principles described may advantageously be formed much like an ordinary feed water heater with heating trays in the upper portion of a heating and deaerating chamber of the type ordinarily used in open feed water heaters and over which the water flows and undergoes the preliminary water heating and deaerating treatment. The apparatus differs from an ordinary feed water heater, however, in that it includes a set of deaerating trays over which the water leaving the heating trays is caused to pass in film-like and broken streams, and also includes provisions for causing the steam provided to heat and deaerate the water to contact with the water as it passes over the deaerating trays in such manner that the steam contacting with the water at any lower level will contain no portion of the air liberated from the water at any upper level in the bank of deaerating trays. This result is best obtained in practice by so arranging the deaerating trays and the co-operating steam flow direction provisions, that the steam will flow horizontally across the inter-tray space of the deaerating tray bank from one end to the other of the latter, through parallel steam flow passages arranged at different levels between the top and the bottom of the bank of the deaerating trays.

For the best practical results of the invention, an air-vapor mixture containing a considerable amount of steam should be continuously vented from the air outlet from the deaerating chamber, said outlet preferably opening from the chamber at a level above the heating trays. The venting of a relatively large amount of steam obviously contributes to a reduction in the air content of the atmosphere in the preliminary heating portion of the apparatus, with a consequent increase in the temperature to which the water is therein heated, and in the amount of air content to be eliminated in the preliminary heating treatment, and thereby reduces the duty of the final deaerating portion of the apparatus and in effect substantially increases the water deaerating capacity of the apparatus. The venting of this relatively large amount of steam from the deaerating heater is in practice not detrimental, since the available heat in the air-steam mixture thus discharged can be readily recovered in a heat exchanger through which the steam mixture is passed and in which the steam is condensed by the transfer of heat to the water to be heated which passes through this heat exchanger to the deaerating heater.

With apparatus constructed as described it is possible to eliminate all air from water passed through the heater at a rate rapid enough to make the apparatus comparable in bulk, and but little more expensive than an ordinary open feed water heater of the same water heating capacity. The advantageous results obtained with the invention are primarily due to the fact that in passing over the deaerating trays the water is brought in intimate contact with steam, as distinguished from a steam-air mixture, for a sufficiently long period of time to permit all of the air in the water to be driven out of solution and to escape from the water. At any given constant total pressure, the solubility of air in water or, more accurately, the solubility of all the gaseous constituents of air, decreases in a known manner with increases in the temperature of the water, and all of the air is driven out of solution when the water is boiled. This does not mean that all air is eliminated from water as soon as the latter begins to boil. On the contrary, the elimination of the air requires time for when the air is driven out of solution it is liberated, in part at least, in the form of very minute bubbles which, because of their small size, tend to move slowly to the surface of the water and do not immediately escape from entrainment by the water when they reach the surface.

When water is heated in an open feed water heater in the ordinary manner, the water is not raised to the boiling temperature because the partial pressure of the air in the air-steam mixture in contact with the water prevents the temperature of the mixture from becoming as high as the temperature of pure steam and the boiling point of water at the same total pressure. In consequence, if the steam is admitted to the deaerating chamber at a temperature of 220° F. say, the temperature of the air-steam mixture in the lower portion of the bank of heating trays may well be at a temperature of 218½° F. or below, and this is the temperature at which the water will pass to the deaerating trays. As the water passes over the deaerating trays and is brought into contact with steam containing no air or at least no significant amount of air, the water is brought to the boiling point thereby driving all air out of solution, and with a suitable tray disposition and rate of water flow over the trays, time is provided for the minute air bubbles to pass to the surface of the water and to escape from the latter. The escape of the air is facilitated, of course, by the fact that the water flows in relatively thin films which are broken up, and the water thereby agitated as the water passes from one tray to another. The escape of the air from the water surface is facilitated also by the fact that the atmosphere into which the air escapes is practically pure steam and there is, hence, no partial air pressure therein.

The various features of novelty which characterize my invention are pointed out with particularity in the claims annexed to and forming a part of this specification; but for a better understanding of the invention, its advantages and specific objects attained with it, reference should be had to the accompanying drawing and descriptive matter, in which I have illustrated and described preferred embodiments of my invention.

Of the drawing:

Fig. 1 is an elevation with parts broken away and in section;

Fig. 2 is an elevation taken at right angles to Fig. 1 with parts broken away and in section;

Fig. 3 is a section on the line 3—3 of Fig. 2; and

Fig. 4 is an elevation with parts broken away and in section illustrating a modified construction.

In the drawing and referring first to the construction shown in Figs. 1, 2, and 3, A represents the shell of a deaerating water heater which, in many respects, is like an ordinary open feed water heater. The water to be deaerated and heated is introduced into the upper end of the tank or chamber A through an inlet pipe B, and in amount regulated by a valve B' and float $B^5$ so as to normally maintain an approximately constant water level in the lower end of the chamber A. The water supplied through the inlet B is discharged into a distributing box D from which the water overflows onto a bank of heating trays or baffles E in passing over which the water is heated nearly to its delivery temperature. From the bank of trays E the water falls in divided streams onto a bank of deaerating trays F from which the water passes into the pool or storage body of water in the bottom of the tank. The steam for deaerating and heating the water is supplied to the tank A by the steam inlet pipe G and first passes across the inter-tray spaces of the bank of deaerating trays F and then into the inter-tray spaces of the bank of heating trays E. The air and uncondensed vapor passes out of the tank A at the upper end of the latter through an outlet or vent H which, advantageously, discharges into a tubular heat exchanger C through which the water to be heated and deaerated passes to the inlet B and which acts as a condenser for the vapor in the air and vapor mixture withdrawn from the tank A. With this heat exchanger the available heat in the air and vapor mixture vented at H from the heater A is recovered with a corresponding preliminary heating of the water to be deaerated. If the pressure in the deaerating chamber is below that of the atmosphere a steam ejector or other vacuum creating device is connected to the air outlet of the heat exchanger C. If the pressure in the deaerating chamber is above that of the atmosphere no ejector is required, and none is shown in the drawing. The water of condensation formed in the heat exchanger C may be drained back into the distributing box D or be otherwise disposed of.

In the apparatus specifically illustrated in Figs. 1, 2, and 3, the trays E are perforated trays such as are ordinarily used in open feed water heaters and are stacked up between tray guides E′ on a tray support shown as comprising beams A′ supported on transverse beams $A^2$. The latter are carried by internal flange portions $A^3$ of the wall of the tank A located at opposite sides of the latter. Cover plates $A^4$, supported by the beams $A^2$ and flanges $A^3$ in conjunction with the baffle I hereinafter refered to, prevent free flow of steam from the space below the trays E into the space surrounding those trays and in effect divide the upper portion of the tank interior into an upper heating compartment and lower deaerating compartment. Steam and air can flow into the heating compartment from the deaerating compartment only through a port $A^5$ at the opposite side of the trays E from the steam inlet G.

The deaerating trays F are arranged in a stack supported by the wall of the tank A through beams $A^6$ and an internal flange $A^7$ carried by the latter. Advantageously, and as shown, the trays F are horizontally disposed and extend parallel to one another and to the general direction of steam flow from the side of the tank at which the steam inlet G is located to the side of the tank at which the port $A^5$ is located. The steam entering through the inlet G is caused to enter one end of the inter-tray space in the bank of trays F as by means of the internal baffle I. Advantageously, as shown, the trays F are formed with water distributing surfaces parallel to the length of the trays and are slightly inclined to the horizontal and are also provided with riffle ribs for retarding the flow of water over the trays and to cause the water to flow through the bank of trays in finely divided and broken streams whereby the desirably large surface and prolonged time of contact between the water and the steam sweeping across the tray bank is ensured. The trays F are relatively narrow and are arranged in superimposed horizontal rows with the trays in each row staggered with respect to the trays in adjacent rows. This provides steam channels of low flow resistance which extend parallel to the length of the trays. Tray guides or wall F′ at the sides of the trays F prevent any substantial tendency of the steam to escape from the inter-tray space at the sides of the bank of trays F.

A cover plate $A^8$ is supported by the beams $A^6$ and flange $A^7$ beneath the baffle I to prevent free flow of steam downward into the space beneath the trays F, and such cover plates may also be provided at the other three sides of the bank of trays F in order to better confine the flow of the steam to its main path of flow longitudinally of the trays F through the inter-tray space of the bank of trays F, and thence upward through the port $A^5$ into the heating space surrounding the heating trays E. A baffle $I^5$ extending between the trays E and F may also be provided to assist in confining the steam flow in the deaerating compartment to the desired horizontal line of steam flow. A baffle $I^6$ prevents the liberated air from passing to the air outlet H except after passing through the inter-tray space of the bank of tubes E. Those skilled in the art will understand that the practice of the invention does not require absolutely steam tight joints in the interior of the tank to insure the desired general directions of air and gas flow, and in particular, the desired horizontal direction of steam flow along and between the trays F, and will also understand that a capacity for a limited steam flow directly across the space between the bank of trays E and F from the bank of trays F into the bottom of the bank of trays E is not really objectionable from a practical standpoint.

Since none, or practically none, of the steam is condensed in sweeping through the bank of trays F, a relatively high steam velocity is maintained, and as the water passes downward from each upper tray in the bank of trays F it comes into contact with practically air free steam, since none of the air liberated at an upper level in the apparatus has opportunity to mix with the steam at a lower level. In consequence, as the water passes from the upper trays to the lower trays F it is continuously scrubbed with steam which in the lowermost portion of the tray bank contains practically no air at all.

Fig. 4 illustrates a modification of the invention specially intended for use where the heat required for the feed water heating and deaerating effects is furnished by steam bled from a turbine which for safety reasons is not passed directly into the deaerating tank AA, but into a closed heater J located therein so as to be wholly or partially submerged in the pool of water in the bottom of the tank AA. $J^4$ represents the steam containing tubes of the heater J, $J'$ the steam inlet, and $J^2$ the outlet for water of condensation formed in the heater. The outlet $J^2$ is connected to a suitable discharge trap $J^3$. The heater J acts as a reboiler and evaporator, which evaporates so much of the deaerated water collecting in the bottom of the tank AA as is required to furnish the steam necessary for heating and deaerating the water passing down over the trays E and F and for properly venting the deaerating chamber. The trays E and F in the tank AA may be the same in construction and arrangement as those employed in the tank A of Figs. 1, 2, and 3, but in Fig. 4 a cover plate $A^3$ is omitted at the end of the bank of trays F remote from the port $A^5$, thus providing a port $A^{16}$ permitting the ready flow of steam from the space below the bank of trays F into the end of the tray bank. $I'$ is a partition preventing the steam from by-passing the trays F.

In the particular construction shown in Fig. 4, the water passing to the deaerating chamber AA passes first through the air cooler and condenser C, and then through a closed water heater K, the water outlet $B^{20}$ of which forms the water supply connection proper for the tank AA. As shown, the heater K is supplied with steam by a supply pipe $K'$, which, as shown, also supplies steam to the steam inlet pipe $J'$ of the header J. Water of condensation formed in the heater K passes through the pipe $K^2$ to the trap $J^3$.

While in accordance with the provisions of the statutes, I have illustrated and described the best embodiment of the invention claimed herein now known to me, it will be apparent to those skilled in the art that formal departures may be made from the method and apparatus specifically disclosed herein without departing from the spirit of my invention as set forth in the appended claims, and that certain features of the invention may sometimes be used with advantage without a corresponding use of other features.

Having now described my invention, what I claim as new and desire to secure by Letters Patent, is:

1. Apparatus for heating and deaerating water comprising a tank having an upper water heating space and a lower deaerating space, a bank of water spreading trays located in said water heating space, water supply means discharging onto the top of said bank of trays, a second bank of water spreading trays located in said deaerating space beneath said first mentioned tray bank and receiving water at its upper end from the upper bank of trays in divided streams distributed over a substantial horizontal area, means responsive to the accumulation of water in a lower portion of the tank for regulating said water supply means so as to maintain a water level in the tank below said second bank of trays, means for supplying steam to said deaerating space and producing a steam flow horizontally across said deaerating space in superimposed streams, and baffle means located out of the path of the water passing from the upper tray bank onto the lower tray bank for guiding the flow of steam passing to said upper tray bank and effective in normal operation to normally prevent downflow of steam from the space surrounding the upper trays, and means for withdrawing air from the upper portion of said water heating space.

2. Water heating and deaerating apparatus comprising a chamber having a water inlet and air outlet in its upper portion and including an upper water heating space and a subjacent water deaerating space, means supplying steam to said chamber to heat and deaerate the water, means for causing substantially all of the steam supplied to said deaerating space to flow horizontally across said deaerating space, in the same general direction in superimposed streams and thence up into said heating space, means for causing the water supplied to said inlet to flow in divided streams first through the heating space and then at a temperature at least substantially equal to that attained in the heating space to flow directly into and through the deaerating space in contact with the steam in said spaces, said last mentioned means including a set of horizontally disposed trays located in said deaerating space and arranged to provide superimposed horizontal paths of flow for the steam leading from one side of the chamber to the other, the parts of said apparatus being correlated and arranged to maintain temperature and pressure conditions in said deaerating space to cause the water to release substantially all of its dissolved air.

Signed at Philadelphia in the county of Philadelphia and State of Pennsylvania, this eighteenth day of September, A. D. 1924.

GEORGE H. GIBSON.